United States Patent [19]
Delahaye

[11] 3,798,898
[45] Mar. 26, 1974

[54] GAS TURBINE PRIME MOVER

[75] Inventor: Jean Delahaye, Ville d'Avray, France

[73] Assignee: Progil, Paris, France

[22] Filed: Oct. 22, 1971

[21] Appl. No.: 191,869

[30] Foreign Application Priority Data
Oct. 22, 1970  France .............................. 70.39153

[52] U.S. Cl. ............. 60/39.02, 60/39.12, 260/346.4
[51] Int. Cl. ........................... F02c 3/00, C07d 1/14
[58] Field of Search............. 60/39.12, 39.02, 39.05; 260/346.4

[56] References Cited
UNITED STATES PATENTS

| | | | |
|---|---|---|---|
| 3,535,345 | 10/1970 | Egbert ............................ | 260/346.4 |
| 3,446,014 | 5/1969 | Foster-Pegg ...................... | 60/39.02 |
| 2,839,892 | 6/1958 | Rosenthal ........................ | 60/39.05 |
| 3,552,122 | 1/1971 | Parmegiani et al. ............... | 60/39.02 |
| 3,603,085 | 9/1971 | Parmegiani ...................... | 60/39.02 |
| 2,781,635 | 2/1957 | Brogdon .......................... | 60/39.05 |

FOREIGN PATENTS OR APPLICATIONS
699,166  10/1953  Great Britain ..................... 60/39.12

*Primary Examiner*—Al Lawrence Smith
*Assistant Examiner*—Warren Olsen
*Attorney, Agent, or Firm*—Norman H. Stepno

[57] ABSTRACT

A gas turbine prime mover is comprised of at least one air compressor, a combustion chamber, an oxidation reactor and an expansion turbine. Turbine power is developed by compressing air in said at least one air compressor, injecting a portion of said compressed air directly into the combustion chamber of the expansion turbine wherein combustion is taking place, injecting remaining compressed air into a chemical oxidation reactor wherein an oxidation reaction is taking place, injecting residual gases of the said oxidation reaction into the said combustion chamber, and thence driving a turbine utilizing the products of the said combustion reaction as the working medium for the said turbine.

11 Claims, 4 Drawing Figures

INVENTOR.
JEAN DELAHAYE

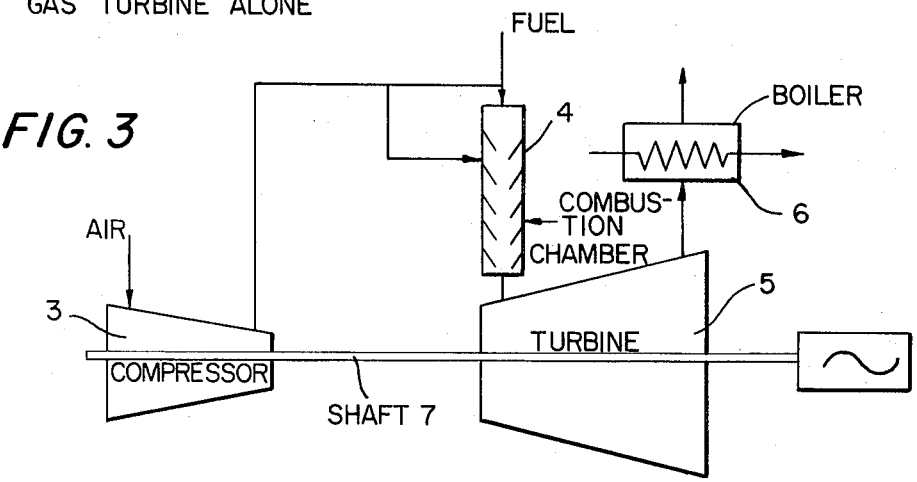
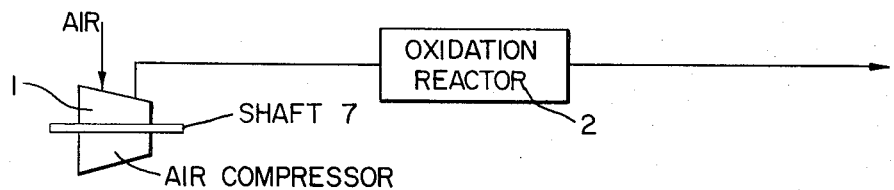
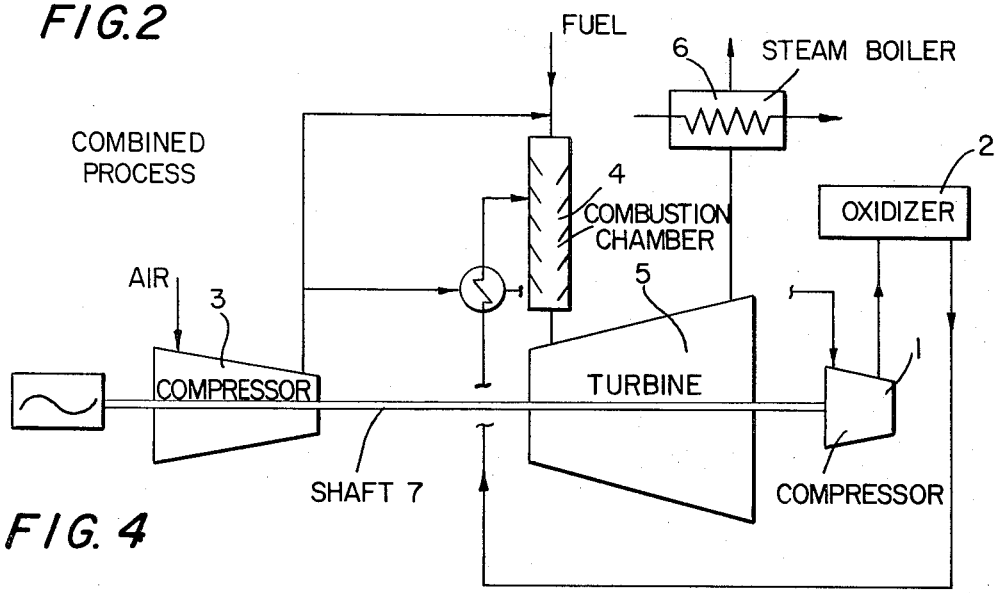

GAS TURBINE PRIME MOVER

BACKGROUND OF THE INVENTION

The present invention relates to an improved gas turbine prime mover and, more especially, to an improved gas turbine prime mover which utilizes the products of reaction from a chemical oxidation process in combination with a combustion gas turbine power plant to enhance the total energetic balance existing in the system.

Basic combustion gas turbine plants generally comprise at least an air compressor driven by a combustion gas turbine, and a combustion chamber wherein a liquid fuel and compressed air are injected, the fuel being burned at constant pressure equivalent to that of the compressor discharge. A power excess remains available on the turbine shaft and calorific value may be recovered from the gases emanating from the said turbine.

Only a minor amount of the injected compressed air is actually utilized in the combustion process. For the most part, such injected compressed air is employed as a diluent and for cooling the various gases subsequent to fuel consumption. Indeed, the temperature must be limited or controlled at the inlet for both the combustion chamber and the expansion turbine to take into account the possibility of and to guard against mechanical failure at high temperatures. Normally, such temperatures are optimized at a value between about 750°C and 1,000°C. Under such conditions, an excess of air in an amount of between about three to six times the amount of air actually necessary for the combustion reaction is employed to ensure a reduction in temperature to a value within the aforesaid desired range. For optimum conditions of combustion, only a slight excess of air would suffice. A very great part of the compressed air or, more correctly, of the compressed oxygen is, therefore, not used at all for the combustion reaction, but is used only as a diluent gas; it could advantageously be replaced by an inert gas.

In the classical chemical oxidation process the oxygen needed therefor is typically supplied by means of air which has been compressed to a certain pressure which varies according to the nature of the process under consideration. Upon completion of the oxidation process, there remains a residual gas containing nitrogen which is derived from the said compressed air and other products, the nature of which again varies according to the particular oxidation under consideration and which may be comprised of carbon monoxide, carbon dioxide, water, and other products having their origin in the said reaction. This residual gas is under a pressure which is equal to the initial pressure, less any pressure drop in the system. It is of course very difficult to recover any energy which could be attributed to the pressure of the residual gas. Often this gas is merely vented to the atmosphere without any recovery whatsoever thereof, although in some instances an expansion turbine can be utilized, but even in the latter instance there is permitted the recovery of only a minor portion of the initial compression energy. Consequently, in the hitherto known processes the nitrogen content of the air is compressed, while only the oxygen content thereof is actually utilized.

From the foregoing, it will be seen that in the conventional or hitherto known gas turbine power plant the compression of a volume of air greatly in excess of that actually needed for the combustion process, per se, has for a consequence the reality that a great quantity of the oxygen component of the compressed air, which oxygen content is most advantageously consumed in the actual oxidation, is utilized only as a diluent gas. A significant need therefore exists for a gas turbine power plant with an improved total energetic balance.

SUMMARY OF THE INVENTION

Accordingly, a primary object of this invention is to provide a gas turbine power plant which overcomes the aforesaid disadvantages inherent in the prior art gas turbine prime movers.

Another object of this invention is to provide a gas turbine power plant with an improved total energetic balance.

Still another object of this invention is to provide a gas turbine power plant which is characterized by a notable saving of energy and concomitant economy insofar as plant investment is concerned.

In attaining these objects, one feature of the invention resides in coordinating the operation of a combustion gas turbine power plant with various chemical oxidation processes. A source of compressed air is provided, a portion of which compressed air is injected directly into the combustion chamber of the turbine to permit of the burning of the fuel therein. The remainder of the said compressed air, very much greater in volume than that fed to the combustion chamber, upon recompression, is fed to a chemical reactor which has been interposed in the combustion gas turbine power plant system. This greater volume of compressed air is used to provide the oxygen necessary to sustain the chemical oxidation reaction or process which is being conducted in the said reactor. The residual gases of reaction from the chemical oxidation process are then injected into the combustion chamber of the turbine system wherein they are employed as the diluent gas and for cooling the various other gases present in the combustion chamber as a consequence of the fuel combustion reaction. This in contradistinction to the direct use of the compressed air as a diluent which characterized the prior art gas turbine plants. Thus, according to the invention the compressed air necessary for the operation of a combustion gas turbine is divided into two distinct streams. A first stream contains approximately that amount of air necessary to provide sufficient oxygen for the fuel combustion reaction in the combustion chamber. A second compressed air stream, far greater in volume than the first, is over-compressed to the desired pressure and is then used to feed the chemical oxidation reaction which is occuring in the reactor which has been interposed in the system and which reaction consumes the oxygen content of the compressed air. This latter reaction additionally gives rise to a residual gas containing nitrogen which is derived from the said compressed air, and other products, the nature of which varies according to the particular oxidation under consideration, and which may be comprised of carbon monoxide, carbon dioxide, water, and other products having their origin in the reaction. This residual gas is next injected in the combustion chamber of the turbine wherein it serves the function of diluent and cooling gas.

Other objects, features, and advantages of the invention will be apparent to those skilled in the art from the

BRIEF DESCRIPTION OF THE DRAWINGS

In the drawings:

FIG. 2 is a schematic block diagram of the oxidation process and reactor elements of the prime mover combination of FIG. 1;

FIG. 3 is a schematic block diagram of the combustion gas turbine element of the prime mover combination of FIG. 1;

FIG. 4 is another schematic block diagram of the gas turbine prime mover of the invention, which is a combination of the elements of FIGS. 2 and 3.

DETAILED DESCRIPTION OF THE INVENTION

Figure 1:
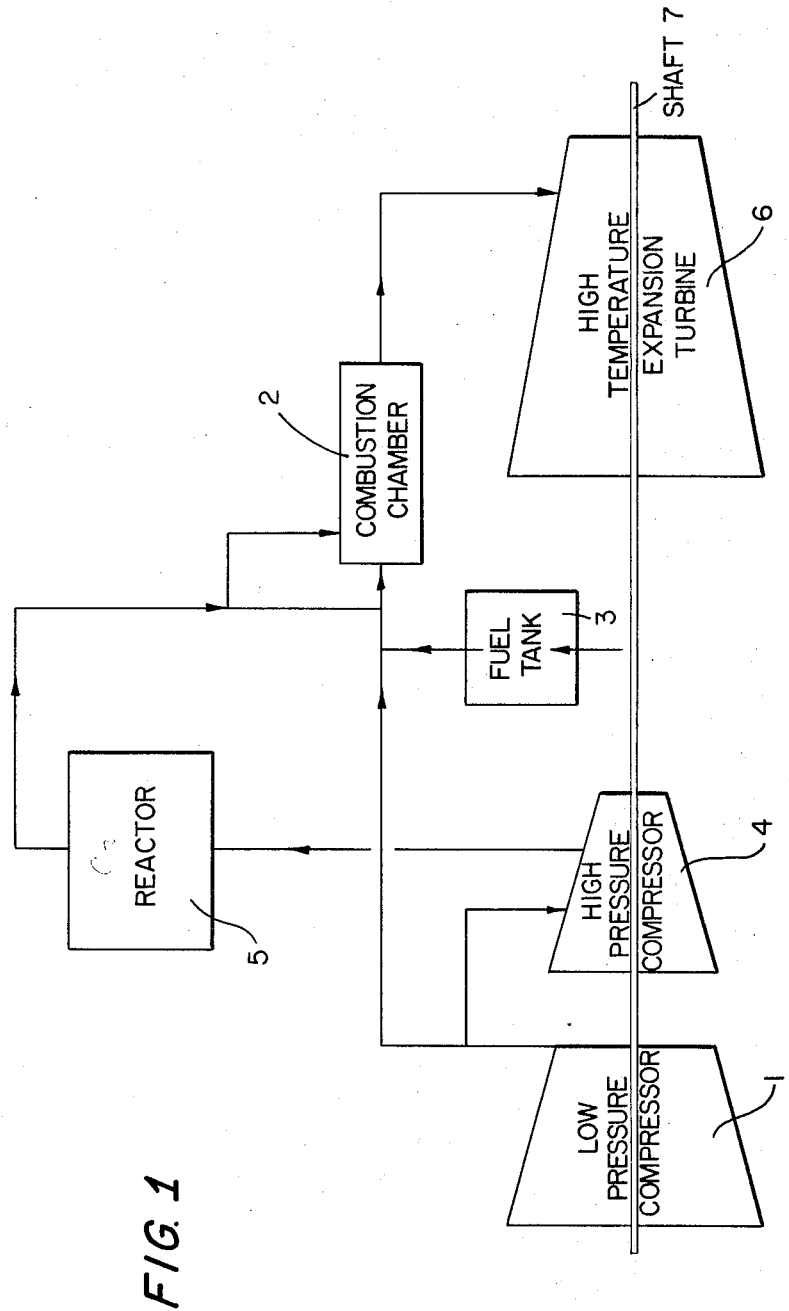
FIG. 1 is a schematic block diagram of the gas turbine prime mover of the invention.

In one embodiment in accordance with this invention, as illustrated in FIG. 1, air is compressed in a low-pressure compressor 1. A portion of the compressed air is fed to the combustion chamber 2 in an amount sufficient to provide enough oxygen for the substantially complete combustion of fuel also injected into the said combustion chamber 2 from the fuel tank 3. The bulk of the said compressed air is, however, conducted to the high-pressure compressor 4, and thence is fed to the reactor 5 wherein there is taking place any one of a number of suitable chemical oxidation reactions with concomitant oxygen consumption. Residual gases from the oxidation reaction are then also injected into the combustion chamber 2 wherein they function as diluents and coolants. The products of reaction in the said combustion chamber are next fed to the high temperature expansion turbine 6 to form the working medium therefor. Advantageously, the turbine 6 and the compressors 1 and 4 are on the same shaft 7.

The following alternative embodiments are also within the scope of the present invention:

a. The air compressors and the expansion turbine may be completely independent.

b. The compressor 1 and the turbine 6 may constitute a standard gas turbine driving a centrifugal compressor 4.

c. When the residual gases emanating from the chemical oxidation process are rich in combustible products, fuel consumption in the combustion chamber may be decreased, which means that these gases may be utilized in lieu of the price of the fuel. Moreover, those gases may be burned in the chamber with a catalyst, if the heating value of said gases is very low.

d. Similarly, if the residual gases still contain a sufficient amount of oxygen, same may be used for feeding and sustaining the combustion process, either wholly or in part, dependent upon the nature of the catalyst employed.

e. The compressed air introduced into the oxidation reaction may be supplied from another source other than the compressor of the combustion turbine.

In order to further illustrate the present invention and the advantages thereof, the following specific examples are given, it being understood that the same are intended only as illustrative and in no wise limitative. It is clear that the power required for the compressors and the power furnished by the turbines are dependent on the nature and yield of those machines, and consequently may vary according to the type of machine and the manufacturer thereof. For the power calculations in the examples given hereinafter, the following formulations have been applied:

Centrifugal compressor (air compression to $P_1$ and $T_1$)

$$W = 1.092 \times 10^{-2} T_1 \times N [(P_2/P_1)^{0.286} - 1] \text{—expressed in KW}$$

(Formula 1)

Axial compressor of gas turbine
Same compresses air up to 7.25 atm. abs.

$$W = 2.42 \, N \, T_1 = 285°K \text{ —expressed in KW}$$

(Formula 2)

Expansion turbine power
Same expands gases which are at 7.25 atm. abs. and 899°C.

$$W = 3.6 \, N \text{ — expressed in KW}$$

(Formula 3)

In these formulae:

$N$ = number of Kg mole/h of gas (of a molecular weight of about 29)
$P_1$ = absolute pressure at inlet
$P_2$ = absolute pressure at outlet
$T_1$ = temperature at inlet (°K)

EXAMPLE 1

In this example, the chemical oxidation process being effected in the chemical reactor is the known oxidation of o-xylene to phthalic anhydride.

In the oxidation reactor, the conditions to which the gases, at both inlet and outlet are subjected, are the following:

TABLE I

| | Air at Inlet | Residual Gas at Outlet |
|---|---|---|
| 1. Hourly rate in kg mole/h | | |
| nitrogen | 1418 | 1418 |
| oxygen | 373 | 74 |
| water | 22 | 19 |
| $CO_2$ | 0 | 42 |
| Total amount | 1813 | 1553 |
| 2. Pressure | 12 Bars abs. | 7.5 Bars abs. |
| 3. Temperature | 12°C. | 40°C. |

The oxidation process, when not associated with the combustion turbine stage, is schematized in the drawing of FIG. 2. An air compressor 1 having four stages and interstage cooling is used; the energy necessary for the compression is 4,550 KW (according to Formula 1). This compressor feeds the oxidation reactor 2 with compressed air.

The operation of the gas turbine alone is illustrated in the diagram of FIG. 3. Air is compressed in the compressor 3, and is charged to the combustion chamber 4, from which the resulting gases are fed to turbine 5. At the turbine outlet, there is charged a boiler 6, which permits of the recovery of steam values.

The conditions under which the turbine operates are the following:

Compressor 3

| | |
|---|---|
| Compressed air | 343 T/h |
| Air temperature | 12°C. |
| Pressure at the inlet | 1 Atm. |
| Pressure at the outlet | 7.25 Atm. |
| Outlet temperature | 274°C. |

Energy consumed     28,000 KW (according to Formula 2)

Expansion turbine 5 and combustion chamber 4

Fuel : 5,940 kg/h LHV (low heating value) : 9,950 Kcal/kg

T inlet : 899°C. (turbine)
P inlet : 7.25 atm. (turbine)
P outlet : 1.02 atm. (turbine)
T outlet : 500°C. (turbine)
Gases : 344 T/h
Power furnished : 43,000 KW (according to formula 3).

Thus, the available energy is 15,000 KW.

For complete fuel combustion, about 110 T/h air are necessary. The air excess is thus about 3.1/1.

The combination, accorording to the invention, of this oxidation process coordinated with a combustion turbine, appears in the schematic diagram of FIG. 4 wherein 1 and 3 are air compressors placed on the same shaft as the expansion turbine 5; 2 denotes the oxidation reactor; 4 the combustion chamber; and 6 the steam boiler. Compressor 1 may be independent of the shaft of the turbine and driven, for example, by a motor. From compressor 3 of the turbine, 1813 kg mole/h air at 274°C. and 7.25 atm. (52.6 T/h) are drawn off and compressed in 1 to 12 bars abs. after cooling. The energy consumed by the compressor 1 is 930 KW (according to Formula 1).

This compressed air is forwarded to the oxidation reactor and the residual gases are injected into the combustion chamber as diluting gas, after fuel combustion, in order to maintain a temperature of 899°C. at the inlet of the expansion turbine. The fuel quantity is approximatively the same as when the turbine operates separately. Same develops an energy of 42,060 KW (according to Formula 3). Hence, the available energy is 14,060 KW.

The energetic balance is, accordingly, as follows:

TABLE II

|  | Oxidation Process And Turbine Separately | Combined Processes According to the Invention |
|---|---|---|
| Furnished energy (KW) | 43,000 | 42,060 |
| Consumed energy (KW) | 28,000+4550=32,550 | 28,000+930=28,930 |
| Difference (KW) | 10,450 | 13,130 |

Thus, the combination of an oxidation process and a turbine, according to the invention, results in a benefit of 2,680 KW. Moreover, there is an economy in plant investment, since the compressor which is necessary for the oxidation process is smaller (energy consumed: 930 KW) than in the case of the separated operations (energy consumed: 4,550 KW).

It too should be borne in midmind that, since the compressed nitrogen for feeding the oxidation reactor has an energy requirement of $4,500 \times 79/100 = 3,600$ KW, the combination according to the invention permits one to recover 2680/3600 or 74.5 percent of the nitrogen compression energy. This recovery is by far greater than when residual gases are expanded in the classical way (normally 25 to 35 percent).

In the boiler 6 there are produced 15 t/h steam 30 bars in the case of the separated operations, and 14 t/h in the case of the combination according to the invention.

EXAMPLE 2

In this example a naphta cut is oxidized to acetic acid in known manner, and this process is effected in combination with the operation of a combustion turbine.

For the oxidation, there are provided 135.2 T/h of air compressed to 55.4 atm. The residual gas amount is 123.4 T/h under 46 atm. and +5°C.; said gas containing 1.8 T/h combustible products (compounds having 3 to 8 carbon atoms) having a heating value of 11,100 Kcal/kg; their complete combustion requires 52.8 T/h air.

Referring to the schematic of FIG. 4, in the compressor 3, 281.8 T/h air are compressed to 7.25 atm.; this consumes an energy of 23,000 KW (Formula 2).

135.2 T/h air drawn off, cooled to 30°C. and then compressed to 55.4 atm. in compressor 1 equipped with three stages, with interstage cooling to 30°C. The consumed energy is 10,000 KW (Formula 1).

The residual gas from the oxidation reaction, after being expanded to 7.25 atm. as well as 146.6 T/h (281.8 − 135.2) of the air from the compressor 3 are introduced into the combustion chamber 4 wherein a catalyst has been provided. The combustible products from the residual gases, when burning, raise the gas temperature to 899°C.

270 T/h gas from chamber 4 are then expanded in turbine 5 where the energy developed is 33,000 KW.

Thus, there is obtained an equilibrated system and the energy which is necessary for the compression of the air of oxidation is produced solely by the combustion of the products to be burned, which are contained in the residual gas. Maximum energy is also recovered due to the pressure of the residual gases. Another advantage is that atmospheric pollution is avoided since the gas vented to the atmosphere is devoid of such products as were initially contained therein.

According to the invention, therefore, not only does the combination process permit of the total consumption of the compressed oxygen, but also of the use of the nitrogen which heretofore had merely been uselessly compressed. Similarly, there is provided a gas turbine power plant which is characterized by a notable saving of energy and concomitant economy insofar as plant investment is concerned.

While the invention has been described and pointed out with reference to certain preferred embodiments thereof, those skilled in the art will appreciate that various changes and modifications and substitutions can be made without departing from the spirit of the invention. It is intended, therefore, that the invention be limited only by the scope of the claims which follow:

What is claimed is:

1. A gas turbine prime mover comprised of: (1) at least one air compressor; (2) a combustion chamber; (3) a non-combusting chemical oxidation reactor for substantially reducing the oxygen content of compressed air supplied thereto; (4) an expansion turbine for providing mechanical power and for driving said air compressor; (5) means for feeding a portion of the air compressed in said at least one compressor (1) directly to said combustion chamber (2); (6) means for feeding the residual portion of the air compressed in said at least one compressor (1) to said oxidation reactor (3) for the consumption of a substantial portion of the oxygen content thereof and concomitant recovery of the energy of said oxygen; (7) means for injecting oxygen-poor residual gases of the reaction occurring in the said oxidation reactor (3) as diluents directly to said combustion chamber (2); and (8) means for feeding the products of the combustion occurring in the said combustion chamber (2) to said expansion turbine (4) for driving the same whereby said turbine prime mover and said oxidation reactor consume less energy than the total energy consumed by each independently of the other.

2. The method for developing turbine power which comprises compressing air in at least one compressor, injecting a portion of said compressed air directly into the combustion chamber of an expansion turbine, separately injecting remaining compressed air from said air compressor into a non-combusting chemical oxidation reactor wherein an oxidation reaction of said remaining compressed air with concomitant energy recovery is taking place, injecting oxygen-poor residual gases of the said oxidation reaction as diluents directly into the said combustion chamber, and thence driving a turbine for the production of mechanical power utilizing the products of the said combustion reaction as the working medium for the said turbine whereby said turbine and said oxidation reactor consume less energy than the total energy consumed by each independently of the other.

3. The gas turbine prime mover as defined by claim 1, wherein the at least one air compressor (1) comprises a low pressure and a high pressure compressor.

4. The gas turbine prime mover as defined by claim 1, further comprising a steam boiler (9) and (10) means for feeding outlet gases of said expansion turbine (4) to said steam boiler (9).

5. The method as defined by claim 2, wherein the air injected into the chemical oxidation reactor is under a greater pressure than the air directly injected into the combustion chamber.

6. The method as defined by claim 2, wherein the combustion reaction is catalytic.

7. The method as defined by claim 2, wherein the residual gases of the oxidation reaction are partially combustible.

8. The method as defined by claim 2, wherein the residual gases of the oxidation reaction both dilute and cool the various gases present in the combustion chamber.

9. The method as defined by claim 2, wherein the amount of compressed air directly injected into the combustion chamber is only slightly in excess of that stoichiometrically required for the combustion reaction.

10. The method as defined by claim 2, wherein the oxidation reaction is that of o-xylene to phthalic anhydride.

11. The method as defined by claim 2, wherein the oxidation reaction is that of a naphtha cut to acetic acid.

* * * * *